US008246927B2

(12) United States Patent
Inoue et al.

(10) Patent No.: US 8,246,927 B2
(45) Date of Patent: Aug. 21, 2012

(54) PROCESS AND APPARATUS FOR PRODUCING CARBON NANOTUBE, CARBON NANOTUBE FIBER, AND THE LIKE

(75) Inventors: Yoku Inoue, Shizuoka (JP); Morihiro Okada, Shizuoka (JP)

(73) Assignee: National University Corporation Shizuoka University, Shizuoka-shi (JP)

( * ) Notice: Subject to any disclaimer, the term of this patent is extended or adjusted under 35 U.S.C. 154(b) by 0 days.

(21) Appl. No.: 12/919,455

(22) PCT Filed: Feb. 24, 2009

(86) PCT No.: PCT/JP2009/053265
§ 371 (c)(1),
(2), (4) Date: Aug. 25, 2010

(87) PCT Pub. No.: WO2009/107603
PCT Pub. Date: Sep. 3, 2009

(65) Prior Publication Data
US 2011/0008240 A1    Jan. 13, 2011

(30) Foreign Application Priority Data
Feb. 25, 2008 (JP) .................................. 2008-043304

(51) Int. Cl.
*D01F 9/12* (2006.01)
*D01F 9/127* (2006.01)
(52) U.S. Cl. .................. 423/447.1; 423/447.3; 977/843
(58) Field of Classification Search .............. 423/447.1, 423/447.2, 447.3; 977/742–754, 842–848
See application file for complete search history.

(56) References Cited

U.S. PATENT DOCUMENTS

| | | | |
|---|---|---|---|
| 7,282,191 B1 * | 10/2007 | Choi et al. | 423/447.3 |
| 2004/0151835 A1 * | 8/2004 | Croci et al. | 427/249.1 |
| 2005/0170089 A1 * | 8/2005 | Lashmore et al. | 427/248.1 |
| 2008/0095694 A1 | 4/2008 | Nakayama et al. | |
| 2008/0170982 A1 * | 7/2008 | Zhang et al. | 423/447.3 |
| 2010/0297441 A1 * | 11/2010 | Zhu | 428/370 |

FOREIGN PATENT DOCUMENTS
JP    2005350308 A    12/2005
(Continued)

OTHER PUBLICATIONS

Inoue, et al., One-step aligned bulk carbon nanotubes by chloride mediated chemical vapor deposition, Applied Physics Letters 2008; 92: 213113-1 to 213113-3.*

(Continued)

*Primary Examiner* — Daniel C. McCracken
(74) *Attorney, Agent, or Firm* — Marshall, Gerstein & Borun LLP

(57) ABSTRACT

A chemical vapor deposition (CVD) device is equipped with a reaction vessel tube and a small vessel substrate in an electric furnace and with a heater and a thermocouple at the periphery thereof. A gas supply portion is connected to one of the reaction vessel tubes, and a pressure adjusting valve and an exhaust portion are connected to the other of the reaction vessel tubes, controlled by a control section such that the exhaust portion vacuum-exhausts the reaction vessel tube interior, the heater sublimates the small vessel substrate interior by rising temperature of catalyst iron chloride, and the gas supply portion bleeds an acetylene gas into the reaction vessel tube. As a result, iron chloride and the acetylene gas vapor-phase-react, a silicon oxide surface layer is formed to form growth nucleus of carbon nanotubes, and carbon nanotubes are grown so as to be oriented vertically.

6 Claims, 14 Drawing Sheets

FOREIGN PATENT DOCUMENTS

| | | |
|---|---|---|
| JP | 2006265006 A | 10/2006 |
| JP | 2007182352 A | 7/2007 |
| JP | 3954967 T | 8/2007 |
| JP | 2008517182 T | 5/2008 |
| JP | 2008523254 T | 7/2008 |
| WO | WO-2005102924 A1 | 11/2005 |

OTHER PUBLICATIONS

Lee, et al., Temperature-Dependent Growth of Vertically Aligned Carbon Nanotubes in the Range 800-1100° C, J. Phys. Chem. B 2002; 106: 7614-7618.*

Gruneis, et al., High quality double wall carbon nanotubes with a defined diameter distribution by chemical vapor deposition from alcohol, Carbon 2006; 44: 3177-3182.*

Schaper, et al., The role of iron carbide in miltiwalled carbon nanotube growth, Journal of Catalysis 2004; 222: 250-254.*

Deck, et al., Predition of carbon nanotube growth success by the analysis of carbon-catalyst binary phase diagram, Carbon 2006; 44: 267-275.*

Hata et al., "Growth of Ultra Long Multi-walled Carbon Nanotube by Thermal Chemical Vapor Deposition," *Science* 306, 1362 (2004).

* cited by examiner

FIG.7A
FIG.7B
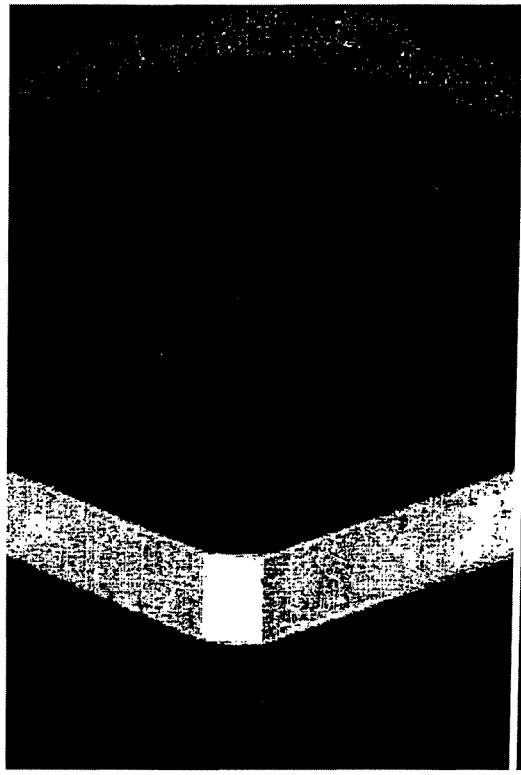

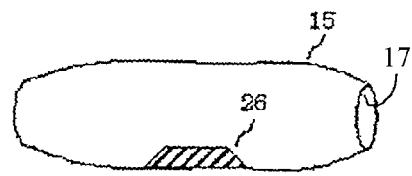
FIG.16A
FIG.16B
FIG.16C
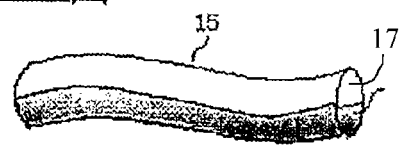
FIG.17
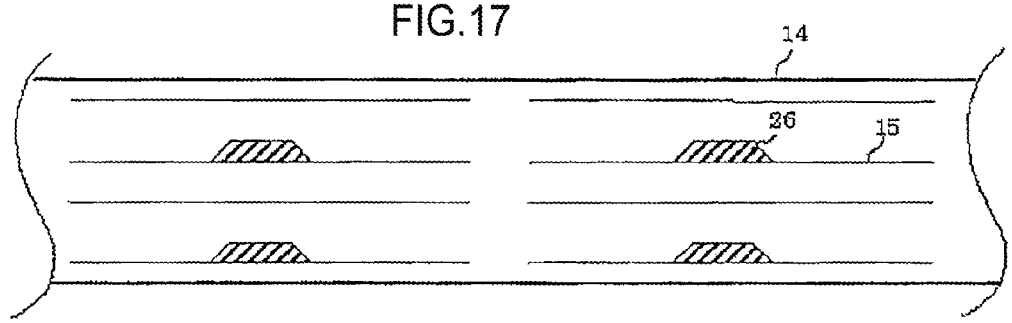
FIG.18
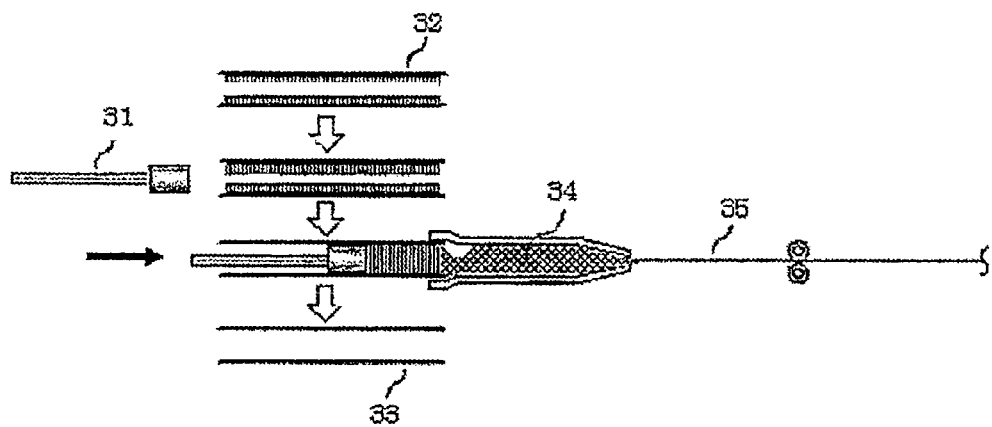

PROCESS AND APPARATUS FOR PRODUCING CARBON NANOTUBE, CARBON NANOTUBE FIBER, AND THE LIKE

CROSS-REFERENCE TO RELATED APPLICATIONS

This application is a national phase application of International Patent Application PCT/JP2009/053265, filed Feb. 24, 2009, which claims the benefit of priority to Japanese Patent Application No. 2008-043304, filed Feb. 25, 2008.

TECHNICAL FIELD

The present invention relates to a method of producing and a device for producing carbon nanotubes, and in particular, relates to a method of producing and a device for producing carbon nanotubes that are oriented vertically at a substrate, and to a method of producing elongated carbon nanotube fibers and the like from carbon nanotubes obtained by these.

BACKGROUND TECHNIQUES

Because carbon nanotubes (CNT) have characteristics such as the mechanical strength is high, they are lightweight, the electricity conducting characteristic is good, the thermal characteristics are good, the field electron emission characteristic is good and the like, attention is being given to the application of carbon nanotubes to probes for scanning probe microscopes (SPM), electrodes for field emission displays (FED), electroconductive resins, high-strength fiber-strengthened resins, corrosion resistant resins, wear resistant resins, high lubricating resins, electrodes of secondary batteries and fuel cells, inter-layer wiring materials of LSIs, biosensors, and the like.

As methods of producing carbon nanotubes, there are, for example, arc discharge, laser evaporation, chemical vapor deposition (CVD) and the like, and a method of producing carbon nanotubes by CVD is disclosed in Patent Document 1.

In CVD, basically, a catalyst metal and a hydrocarbon that is a carbon source are made to coexist, and carbon nanotubes are synthesized at a process temperature of, for example, from 650° C. to 1300° C. When the size of the catalyst particles is small, single-layer carbon nanotubes (SWNT) are obtained. There are many variations in the type of the catalyst, the way of supporting thereof (floating on the substrate and the like).

For example, there is a technique of forming carbon nanotubes by sputtering or the like a metal film such as iron or aluminum or the like as a catalyst on a plate-shaped substrate, and, in a state in which this is set in an electric furnace and the electric furnace interior is raised to a predetermined temperature, bleeding a gas, in which acetylene and hydrogen, ammonium or the like are blended, into the electric furnace and causing it to chemically react with the catalyst, thereby orienting the carbon nanotubes vertically on the substrate.

Patent Document 1: Japanese Patent Application Laid-Open No. 2006-265006
Patent Document 2: US Patent Application Publication US20080170982A1
Patent Document 3: Japanese Patent Application National Publication No. 2008-517182
Patent Document 4: Japanese Patent No. 3954967
Patent Document 5: Japanese Patent Application National Publication No. 2008-523254

DISCLOSURE OF THE INVENTION

Problems to be Solved by the Invention

However, in the above-described conventional techniques, there was the problem that carbon nanotubes cannot be produced simply, such as a metal film must be formed on the substrate, carbon nanotubes do not grow when the blend ratio of gasses varies, and the like.

The present invention was made in consideration of the above-described circumstances, and objects thereof are to obtain a method of producing and a device for producing carbon nanotubes that can simply produce carbon nanotubes that are oriented vertically, and to produce elongated carbon nanotube fibers and the like from these carbon nanotubes.

Means for Solving the Problems

In order to achieve the above-described object, the method of producing carbon nanotubes of the invention comprising: vacuum-exhausting, to less than or equal to $10^{-2}$ Torr, a reaction vessel tube interior containing silicon oxide and iron chloride; heating the reaction vessel tube interior to a temperature in a range of 700° C. to 900° C.; bleeding acetylene into the reaction vessel tube interior at a supply pressure within a range of 0.1 Torr to 50 Torr, wherein, at a time of start of bleeding acetylene, the pressure of said acetylene is set to be lower than the supply pressure, and growing carbon nanotubes from iron carbide that is formed by a chemical vapor-phase reaction in the presence of the iron chloride.

In accordance with this invention, due to the sublimated iron chloride and the acetylene gas vapor-phase-reacting, carbon nanotubes are oriented vertically on the silicon oxide surface by chemical vapor deposition. In this way, there is no need to form a metal film on the substrate, and there is no need to blend the gas that is supplied to the reaction vessel tube interior with another gas other than acetylene, and therefore, carbon nanotubes that are oriented vertically can be produced simply.

Note that it is preferable that the silicon oxide be a silicon oxide compound that is $SiO_x$ ($0<x\leq2$).

The method can further comprise disposing in the reaction vessel tube interior a hollow substrate having an inner wall, wherein the silicon oxide is disposed on a surface of the inner wall, and wherein the substrate comprises a circular or polygonal cross-sectional configuration, and growing the carbon nanotubes with the iron chloride provided at the inner wall.

Moreover, it is preferable that the iron chloride include at least one of iron (II) chloride and iron (III) chloride.

In one embodiment of the invention, carbon nanotubes, that are formed by these production methods, are gathered into a congregate mass shape, and, by spinning these as materials for spinning, there are no limitations on the length or width or the like that is spun with respect to the method of spinning from the carbon nanotubes that are in a state of being formed on the substrate, and furthermore, tapes and sheets of arbitrary widths and uniform thicknesses, and not just fiber-shaped structures, are formed by the spinning method.

One embodiment of the inventive method produces a substrate, in which carbon nanotubes are oriented vertically. Further, one embodiment of the invention patterns a vertically-oriented carbon nanotube formation region to fabricate a substrate in which carbon nanotubes are oriented vertically at the region.

A device for producing carbon nanotubes according to an embodiment of the invention comprises: exhausting means for exhausting a reaction vessel tube interior in which are placed a substrate, at which at least a portion of a surface is silicon oxide, and iron chloride; temperature adjusting means for adjusting to a predetermined temperature at which the iron chloride sublimates; and gas supplying means for supplying hydrocarbon gas to the reaction vessel tube interior that is adjusted to the predetermined temperature, and vertically orienting carbon nanotubes on the substrate by chemical vapor deposition.

In accordance with this invention, there is no need to form a metal film on the substrate, and there is no need to blend the gas that is supplied to the reaction vessel tube interior with a gas other than acetylene, and therefore, carbon nanotubes that are oriented vertically can be produced simply.

Further, in accordance with this invention, because the tubular substrate is set in a heating furnace, carbon nanotube formation, that arises at the entire surface of high-temperature heated portion within the quartz tube, can be caused only at the tubular substrate interior.

Provided that a congregate mass of the carbon nanotubes fabricated by the present method can be formed, an elongated yarn can be easily obtained. In order to obtain a congregate mass, a base material of any shape such as plate-shaped, rod-shaped, tubular, or the like is good, and therefore, a method of physically cutting-off and recovering the carbon nanotubes that are grown on these base materials is effective.

In addition, other methods, such as entirely submerging carbon nanotubes and materials in a hydrogen fluoride aqueous solution and separating from the silicon oxide foundation and recovering the carbon nanotubes, and the like, are also possible, but the chemicals and processes increase, and such methods are not economical.

Further, when using a method that physically cuts-off and recovers carbon nanotubes, various methods can be employed industrially such as, for example, a method that grows carbon nanotubes on the surface of a structure, in which a base material is made into a fiber-like bundle like an ear of rice, and gathers the carbon nanotubes by squeezing by the teeth of a comb, a method that grows carbon nanotubes on numerous spherical base materials, such as small metal spheres or glass spheres or the like, and separates and recovers only the carbon nanotubes in a drum that rotates these, and the like. Among these, when a tubular substrate that becomes the small vessel that houses iron chloride is set as a base material within a reaction vessel, carbon nanotubes grow densely only at the small reaction vessel inner wall surface. After growth is finished, with this small vessel substrate being used as a cylinder, a piston is inserted-in from one opening, and when the small vessel substrate interior is squeezed-through and the carbon nanotubes are pushed-out, a carbon nanotube congregate mass can be obtained easily from the other end.

The small vessel substrate that becomes the cylinder here does not have to be a straight cylindrical tube, and, in order to increase the surface area at which the carbon nanotubes grow, the piston may be made to have elasticity, or the like, and provided that it can pass through the interior, the surface shape is polygonal, oval, star-shaped or the like and there are no particular limitations, and the surface shape may be twisted in the longitudinal direction, and may be a non-uniform cross-section.

Further, when plural small vessel substrates, that hold iron chloride therein, are placed within a reaction vessel, the surface area at which the carbon nanotubes grow increases, and therefore, the produceability can be improved.

Note that, by pulling-out a portion of a congregate mass from a carbon nanotube congregate mass that is obtained as described above, carbon nanotube fibers or tapes or the like can be produced easily. As described above, the gathering of the carbon nanotube congregate mass and the fiber spinning can be separated into independent processes, and therefore, provided that the supplying of a carbon nanotube congregate mass newly to the fiber yarn source is continued, the fiber yarn can be made to be any length.

Effects of the Invention

In accordance with the present invention, carbon nanotubes that are oriented vertically on a substrate can be easily formed, and further, the carbon nanotubes that are produced by the present invention can fabricate fibers, tapes or sheets, and the substrate that forms the carbon nanotubes that are oriented vertically has a low reflectance characteristic with respect to lights of a broad wavelength region, and further, carbon nanotubes that are oriented vertically can be pattern-formed on a substrate.

BRIEF DESCRIPTION OF THE DRAWINGS

FIG. 7A is a drawing showing the external appearance of a portion of a quartz substrate,
and FIG. 7B is a drawing showing the external appearance of a quartz substrate at which carbon nanotubes have been grown.

FIGS. 16A-16C are drawings of small vessels or hollow substrates that hold a catalyst therein, that are applied to the obtaining of a carbon nanotube congregate mass. FIG. 16A is a substrate whose cross-sectional area varies. FIG. 16B is a substrate whose cross-section is a star-shaped polygon shape. FIG. 16C is a substrate that is twisted and in whose interior a catalyst is coated.

FIG. 17 is a drawing in which small vessel substrates 15 are placed within a reaction vessel tube 14. This is applied to the production of more carbon nanotubes without making the producing device larger.

FIG. 18 is a drawing showing a state in which carbon nanotubes are squeezed-through and pushed-out by a piston from a small vessel substrate, that holds grown carbon nanotubes at the inner wall surface, and the carbon nanotubes are supplied to a carbon nanotube congregate mass, and a state in which elongated carbon nanotube fibers are simultaneously spun from the carbon nanotube congregate mass.

DESCRIPTION OF THE REFERENCE NUMERALS

Figure 1:
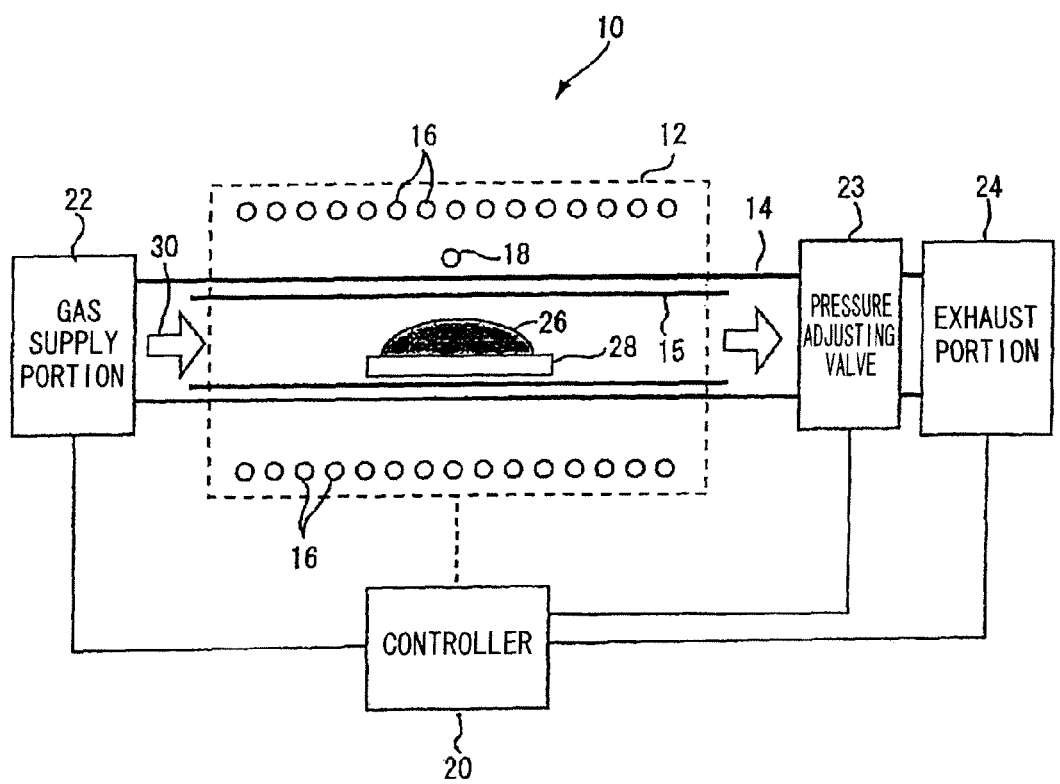
FIG. 1 is a schematic structural drawing of a CVD device.

10 CVD device
12 electric furnace
14 reaction vessel tube
15 small vessel substrate
16 heater
17 inner wall of hollow substrate
18 thermocouple
20 control section
22 gas supply portion
23 pressure adjusting valve
24 exhaust portion
26 catalyst
28 quartz substrate
30 acetylene gas
31 piston
32 tubular small vessel substrate holding carbon nanotubes at the inner wall.
33 tubular small vessel substrate after carbon nanotube removal.
34 carbon nanotube congregate mass.
34 carbon nanotube fiber.

BEST FORMS FOR IMPLEMENTING THE INVENTION

Hereinafter, embodiments of the present invention are described in detail with reference to the drawings.

The schematic structure of a CVD device 10, that grows carbon nanotubes on a substrate by CVD, is shown in FIG. 1.

As shown in this drawing, the CVD device 10 is equipped with an electric furnace 12. A reaction vessel tube 14 is passed-through the electric furnace 12 interior, and a heater 16, a thermocouple 18 are provided at the periphery of the reaction vessel tube 14.

The heater 16 and the thermocouple 18 are connected to a control section 20, and the control section 20 controls the heater 16 on the basis of the temperature detected by the thermocouple 18 so that the interior of the reaction vessel tube 14 becomes a predetermined temperature that is suited to the growing of carbon nanotubes.

Further, a gas supply portion 22 is connected to one of the reaction vessel tube 14, and a pressure adjusting valve 23 and an exhaust portion 24 are connected to the other of the reaction vessel tube 14. The gas supply portion 22, the pressure adjusting valve 23 and the exhaust portion 24 are controlled by the control section 20.

The gas supply portion 22 bleeds a hydrocarbon gas into the reaction vessel tube 14. In the present embodiment, acetylene ($C_2H_2$) gas is used as an example of the hydrocarbon gas.

The pressure adjusting valve 23 is a structure that adjusts the pressure of the acetylene gas that is supplied from the gas supply portion 22.

The exhaust portion 24 is a structure that vacuum-exhausts the reaction vessel tube 14 interior, before the acetylene gas is bled into the reaction vessel tube 14 interior, and, for example, a rotary pump is used.

Figure 2:
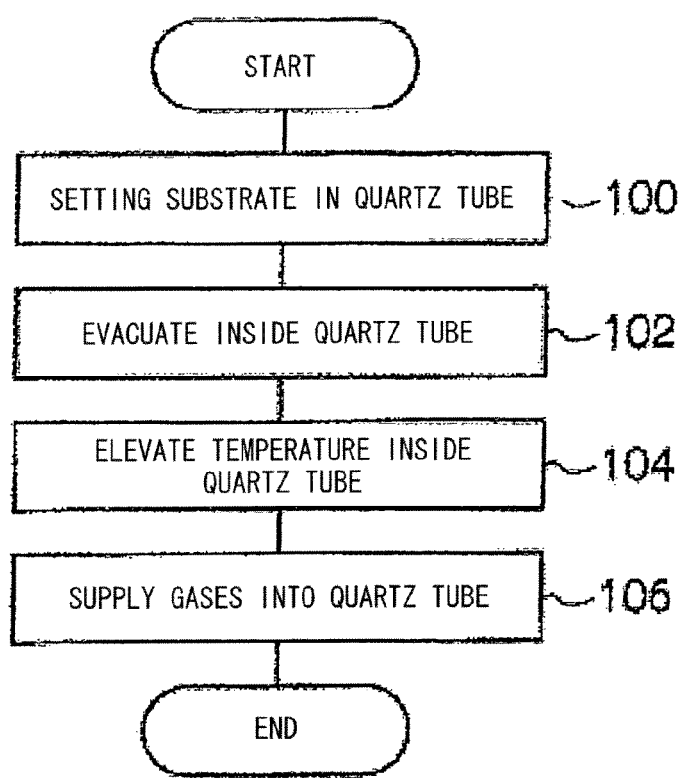
FIG. 2 is a flowchart showing a method of growing carbon nanotubes.

Next, the method of producing carbon nanotubes is described with reference to the flowchart shown in FIG. 2.

First, in step 100, as shown in FIG. 1, a quartz plate substrate 28 on which a catalyst 26 is placed is set within a small vessel substrate 15. Note that the catalyst 26 does not necessarily have to be placed on the quartz plate substrate 28, and it suffices for the catalyst 26 and the quartz plate substrate 28 to be within the small vessel substrate 15. Or, if the object is to grow carbon nanotubes only on the small vessel substrate inner wall, it is possible to not use the quartz plate substrate.

Note that a powder of iron chloride including at least one of iron (II) chloride ($FeCl_2$) and iron (III) chloride ($FeCl_3$) can be used as the catalyst 26, but it is preferable to use iron (II) chloride ($FeCl_2$) as in the present embodiment.

Further, it suffices for at least the surface of the quartz plate substrate 28 to be silicon oxide, and preferably quartz ($SiO_2$) as in the present embodiment.

As the substrate that grows the carbon nanotubes, various substances other than silicon oxide, such as alumina, sapphire and the like that are often used industrially and that have high-temperature heat resistance, have been tried, but iron carbide that is the carbon nanotube growth nucleus also is not formed appropriately, and good results have not been obtained.

For the silicon oxide, other than the $SiO_2$ that is known as so-called quartz, there is SiO, and further, the silicon oxide ratio of a silicon oxide layer that is formed by sputtering or the like varies (1.9 or the like) from these and is not constant, but, including these, it suffices for the silicon oxide to be $SiO_x$ ($x \leq 2$).

In step 102, the control section 20 instructs the exhaust portion 24 to vacuum-exhaust the reaction vessel tube interior. Due thereto, the exhaust portion 24 exhausts the reaction vessel tube 14 interior such that, for example, the pressure of the reaction vessel tube 14 interior becomes less than or equal to $10^{-2}$ Torr.

In step 104, the control section 20 controls the heater 16 on the basis of the temperature detected by the thermocouple 18, so that the electric furnace 12 interior rises to a predetermined temperature. Note that the predetermined temperature is set to a temperature that is greater than or equal to a lower limit value of temperatures at which at least the catalyst 26 sublimates and vapor-phase-reacts with the gas that is bled into the reaction vessel tube 14 interior, and is set to a temperature within a range of, for example, 700-900° C.

In step 106, the control section 20 instructs the gas supply portion 22 to supply acetylene gas 30 to the reaction vessel tube 14 interior, and adjusts the pressure control valve 23 such that the acetylene gas 30 becomes a predetermined pressure. Due thereto, the acetylene gas 30 of a predetermined pressure and a predetermined flow rate is bled into the reaction vessel tube 14 interior. Note that the predetermined pressure and predetermined flow rate are set to a pressure and flow rate that are such that carbon nanotubes can grow. The predetermined pressure is set to a pressure within the range of, for example, 0.1-50 Torr, and the predetermined flow rate is set to a flow rate within a range of, for example, 20-500 sccm in accordance with the inner diameter of the reaction vessel tube 14.

When the acetylene gas 30 of the predetermined pressure and predetermined flow rate is bled into the reaction vessel tube 14 interior with the catalyst within the reaction vessel tube 14 being in a sublimated state in this way, the catalyst 26 and the acetylene gas 30 vapor-phase-react, and carbon nanotubes are grown so as to be oriented vertically on the quartz plate substrate 28. Note that the growth time is, for example, 5-60 minutes, although it depends on the conditions. Accordingly, the supply time of the gas is set to be at least greater than or equal to the supply time from the start of the supply of the gas until the growth of the carbon nanotubes stops.

The process of growing of the carbon nanotubes is described next. As described above, when the acetylene gas 30 is bled into the small vessel substrate 15 interior in a state in which the reaction vessel tube 14 interior, in which the catalyst 26 and the quartz plate substrate 28 are set, is vacuum-exhausted and the temperatures of the reaction vessel tube 14 interior and the small vessel substrate 15 interior are raised to temperatures at which the catalyst sublimates, the sublimated catalyst 26 and the acetylene gas 30 vapor-phase-react.

Figure 3:
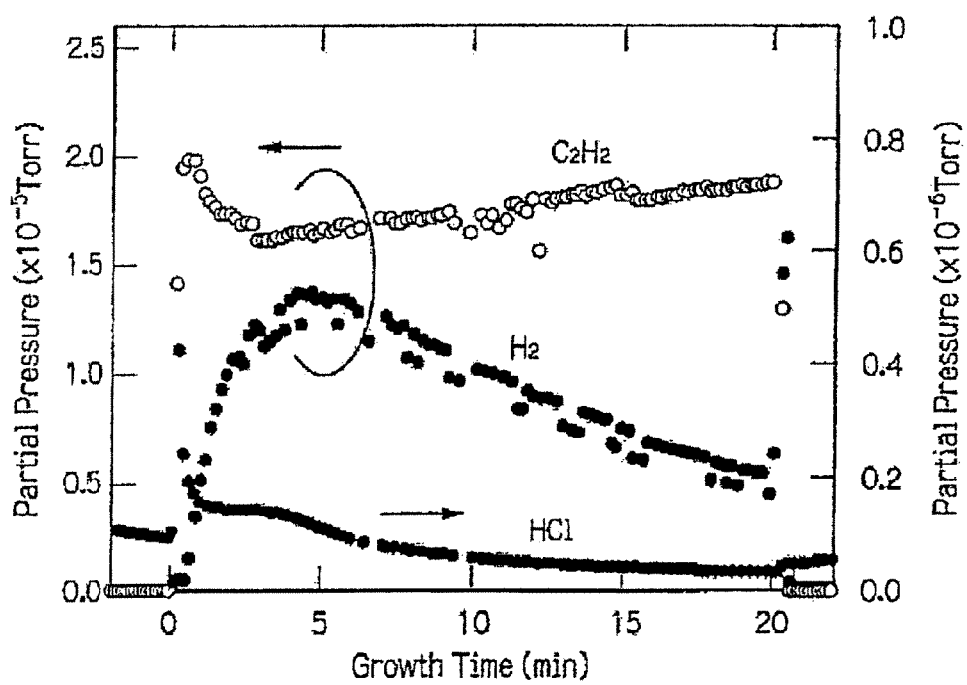
FIG. 3 is a drawing showing the relationship between pressures of respective substances and growth times of carbon nanotubes in a process of growing carbon nanotubes.

In order to examine the process of growing carbon nanotubes, the present inventors measured gasses, that are generated accompanying the reaction at the time when the acetylene gas 30 is bled into the small vessel substrate 15 and is made to vapor-phase-react with the catalyst 26, and the pressures thereof. The results thereof are shown in FIG. 3.

As shown in this drawing, when acetylene gas ($C_2H_2$) is bled in, hydrogen chloride (HCl) is generated suddenly in a short time period. Further, during the time until about five minutes from the start of the bleeding-in of the acetylene, the hydrogen ($H_2$) increases, and thereafter decreases gradually. It is thought that the HCl and H gasses are related to the growth of the carbon nanotubes.

In the present embodiment, because the catalyst 26 is iron (I) chloride, the generation of hydrogen chloride is expressed by the following chemical reaction formula.

$$FeCl_2 + C_2H_2 \rightarrow FeC_2 + 2HCl \quad (1)$$

Due to the iron (II) chloride and the acetylene vapor-phase-reacting in this way, $FeC_2$ (hereinafter called iron carbide) and hydrogen chloride are generated. The powders of this iron carbide repeatedly collide with one another, and deposit on the quartz plate substrate 28. Then, the carbon is separated-out from this iron carbide while the iron remains ($FeC_2 \rightarrow Fe + 2C$), and a graphene layer is formed. This is thought to be the start of the growth of the carbon nanotubes.

Then, hydrogen is generated by a dehydrogenation reaction by the remaining iron and hydrogen chloride. This is expressed by the following chemical reaction formula.

$$Fe + 2HCl \rightarrow FeCl_2 + H_2 \quad (2)$$

Due to the chemical reaction such as the above being repeated, carbon nanotubes grow. Namely, iron carbide and hydrogen chloride are generated by the chemical reaction between the iron chloride and acetylene, and carbon is separated-out from the generated iron carbide and the iron remains, and iron chloride and hydrogen are generated by the chemical reaction between the remaining iron and hydrogen chloride, and iron chloride and acetylene again chemically react, and iron carbide and hydrogen chloride are generated. Due to this being repeated, carbon nanotubes grow.

Note that, because the dehydrogenating effect of iron chloride on hydrogen compounds is very marked, the acetylene decomposition expressed by formula (I) is carried out immediately. Due thereto, carbon is supplied immediately to the carbon nanotube growth core, and therefore, the carbon nanotube generation also is carried out immediately.

All of the catalyst 26 placed on the substrate in the drawings sublimates and disappears from on the substrate, and does not impede carbon nanotube formation on the substrate.

As the results of intense research based on these circumstances and examinations, the inventors completed the present invention.

Note that, when the acetylene gas 30 is supplied to the small vessel substrate 15 interior, if the pressure of the acetylene gas 30 is too large from the start, the particles of the powder of the iron carbide that is generated by the chemical reaction between iron chloride and acetylene are too large, and there are cases in which the carbon nanotubes are not oriented vertically. Therefore, at the start of the supplying of the acetylene gas 30, the pressure thereof is made to be relatively low (e.g., around 0.6 Torr), and the powder of the iron carbide is disposed on the quartz plate substrate 28 at a density that is suited to the carbon nanotubes orienting vertically, and thereafter, the pressure may be made to be greater (e.g., around 10 Torr). Due thereto, the carbon nanotubes can appropriately be oriented vertically.

Although the above description is in line with the structure of the CVD device of FIG. 1, the method of producing carbon nanotubes of the present invention is not limited to the structure of these devices.

In the CVD reaction of the present invention, it suffices for the above-described vapor-phase chemical reaction to be maintained with respect to the substrate surface at which the carbon nanotubes grow. Therefore, the CVD reaction is at a reaction temperature at which the iron chloride, that carries out a catalytic working with respect to these reaction systems, sublimates, and it suffices for the hydrocarbon gas that becomes the carbon source such as acetylene to be supplied thereto, and the above-described substrate surface to be maintained in an atmosphere under these reaction conditions.

Accordingly, from industrial production efficiency, the carbon nanotubes of the present invention that are oriented vertically can be produced efficiently by placing a substrate, that has a silicon oxide surface that becomes the carbon nanotube growth substrate, and sublimating this too in an atmosphere that is maintained at a predetermined temperature, or supplying iron chloride by a carrier gas, and further, supplying a hydrocarbon gas such as acetylene or the like, and maintaining the aforementioned atmosphere temperature at the chemical vapor-phase reaction temperature of these.

The carbon nanotubes that are produced in this way are gathered as a congregate mass as will be described below, and carbon nanotube elongated fibers or elongated tapes can be produced easily.

In such a structure, a small vessel substrate, that is cylindrical and whose inner wall surface is made to be a silicon oxide layer that grows the carbon nanotubes, is used as the substrate that grows the carbon nanotubes, and it is effective to squeeze-through by a piston the carbon nanotubes that are grown on the inner wall and push-out a carbon nanotube congregate mass. This cylinder does not have to be a straight cylindrical tube, and provided that a piston that has elasticity can pass therethrough, the cross-sectional shape thereof such as shown in FIG. 16 may be any shape such as polygonal, oval, star-shaped (FIG. 16-B) or the like. And, there may be twist in the longitudinal direction (FIG. 16-C), or the cross-sectional surface area may be non-uniform (FIG. 16-A). The entire material of these small vessel substrates (cylinders) does not have to be quartz, and may be any material provided that there is, on the surface, a silicon oxide layer that is suited to carbon nanotube growth.

To provide an industrially applicable example, if carbon nanotubes can be produced by a device of the same scale and over the same time, it is preferable to be able to produce more carbon nanotubes in one work operation. To this end, as shown in FIG. 17, it is effective to place plural small vessel substrates within the reaction vessel. Catalysts are disposed by being placed or coated at the respective interiors within the small vessel substrates shown in FIG. 17, and the carbon nanotubes, that are grown on the small vessel substrate inner wall surface in this way, are pushed-out by the piston and intermittently supplied to a carbon tube elongated fiber producing device. In this way, carbon nanotube elongated fibers can be produced continuously.

EXAMPLE 1

Examples of the Present Invention are Described Next

The present inventors grew carbon nanotubes on the quartz plate substrate 28 by using the CVD device 10 described above. Note that the size of the quartz plate substrate is 10 (mm)×10 (mm)×1 (mm), and the diameter of the reaction vessel tube 14 is 36 mm.

Figure 4:
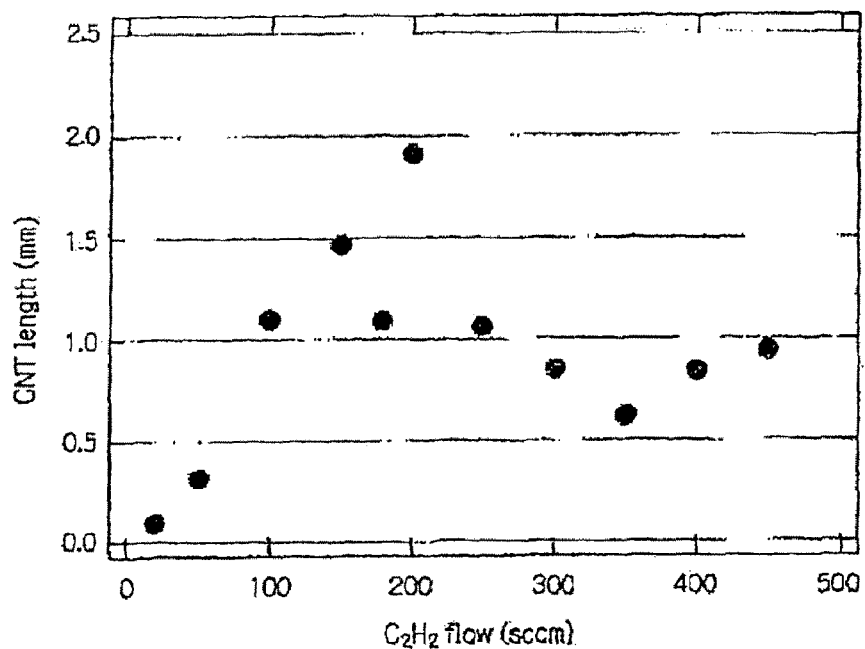
FIG. 4 is a drawing showing the relationship between flow rate of acetylene gas and length of grown carbon nanotubes.

Then, the temperature of the electric furnace 12 interior was made to be 820° C. and the pressure of the acetylene gas 30 was made to be 10 Torr, and the flow rate of the acetylene gas 30 was varied, and the length of carbon nanotubes that were grown by the above-described method was measured. The results thereof are shown in FIG. 4. As shown in this drawing, when the flow rate of the acetylene gas 30 was 200 sccm, the length of the carbon nanotubes was the best at approximately 2.1 mm. Note that, because it is thought that the flow rate of the acetylene gas 30 at which the length of the carbon nanotubes becomes the longest varies in accordance with the diameter of the reaction vessel tube 14, it is preferable to set the most preferable flow rate in accordance with the diameter of the reaction vessel tube 14.

Figure 5:
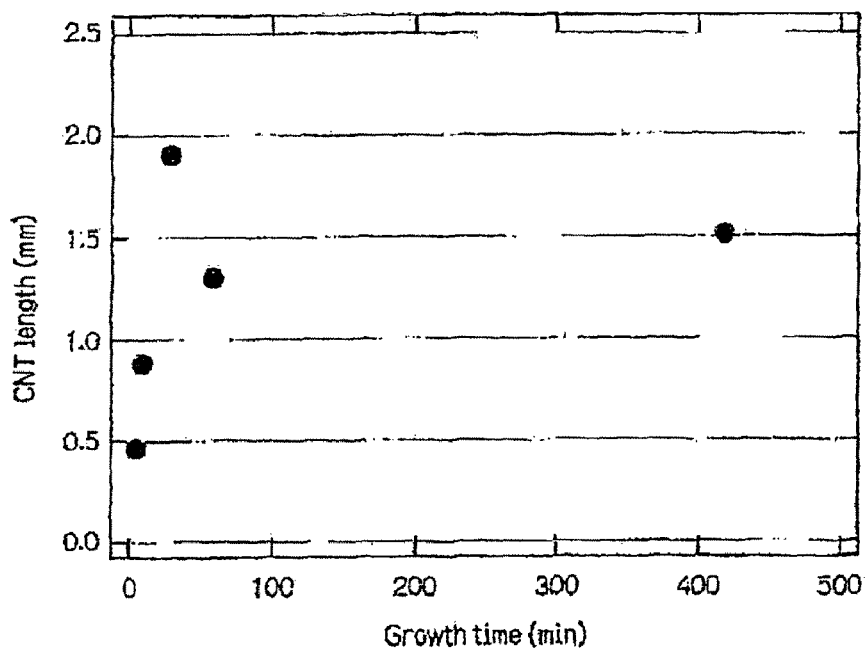
FIG. 5 is a drawing showing the relationship between growth time of carbon nanotubes and length of grown carbon nanotubes.
Figure 6A:
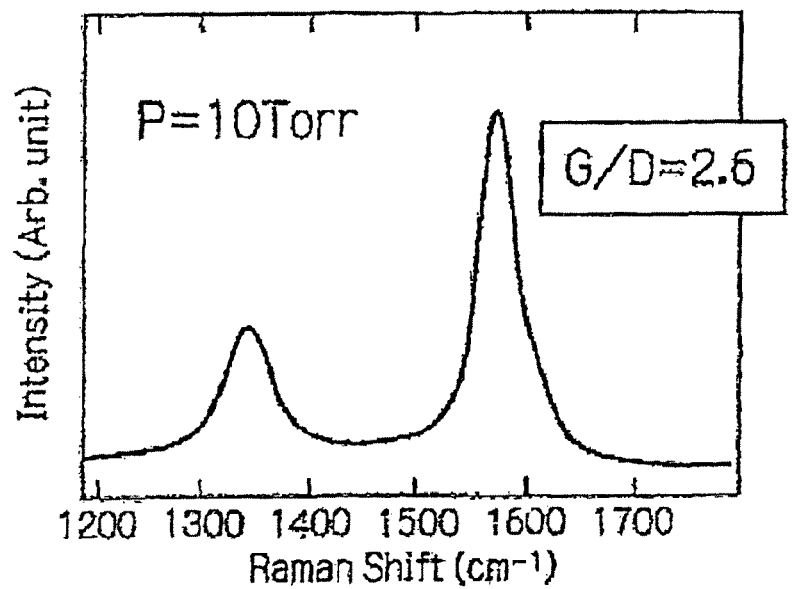
FIG. 6A is a drawing showing the results of Raman measurement of carbon nanotubes that were grown with the pressure of acetylene gas being 10 Torr.
Figure 6B:
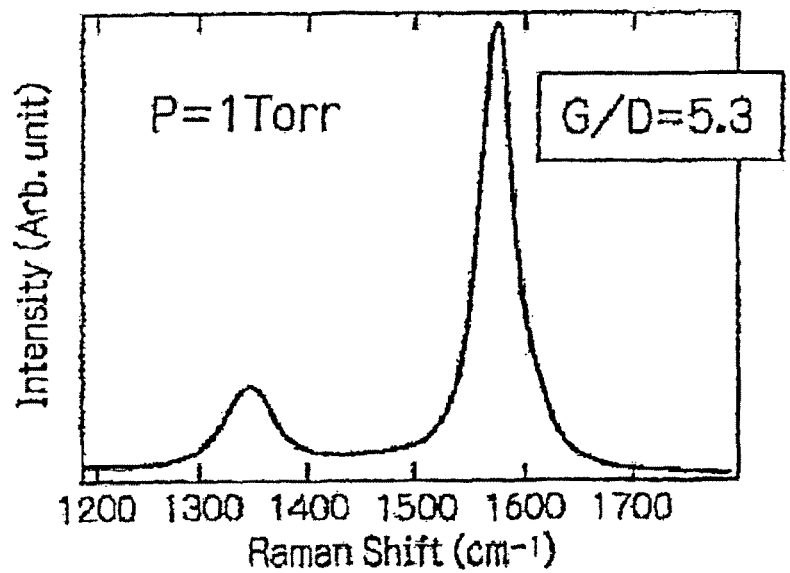
FIG. 6B is a drawing showing results of Raman measurement of carbon nanotubes that were grown with the pressure of acetylene gas being 1 Torr.

Further, the relationship between the growth time of the carbon nanotubes and the length thereof, when the temperature of the electric furnace 12 interior was made to be 820° C., the pressure of the acetylene gas 30 was made to be 10 Torr, and the flow rate of the acetylene gas 30 was made to be 200 sccm, was measured. The results thereof are shown in FIG. 5. As shown in this drawing, it can be understood that the growth rate is high in the initial 30 minutes, and thereafter, the growth comes to a stop. Note that, when the pressure was 10 Torr, the length of the carbon nanotubes was 2.1 mm, and the growth time was 20 minutes.

Figure 8:
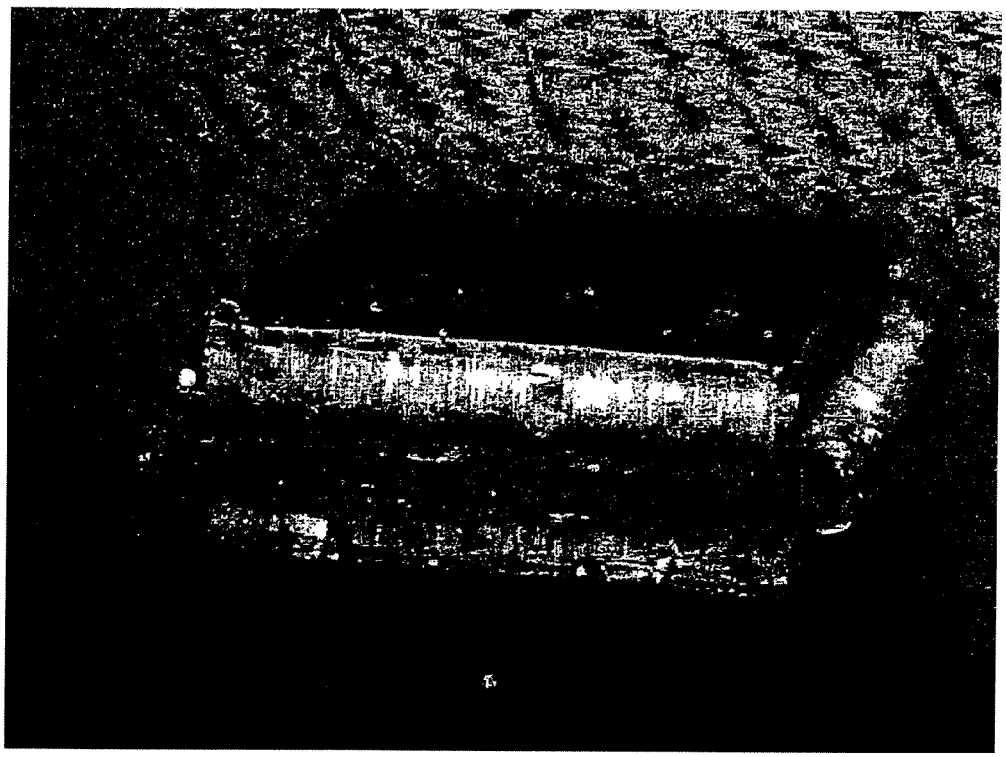
FIG. 8 is a drawing showing the external appearance of carbon nanotubes grown on a quartz substrate.
Figure 9A:
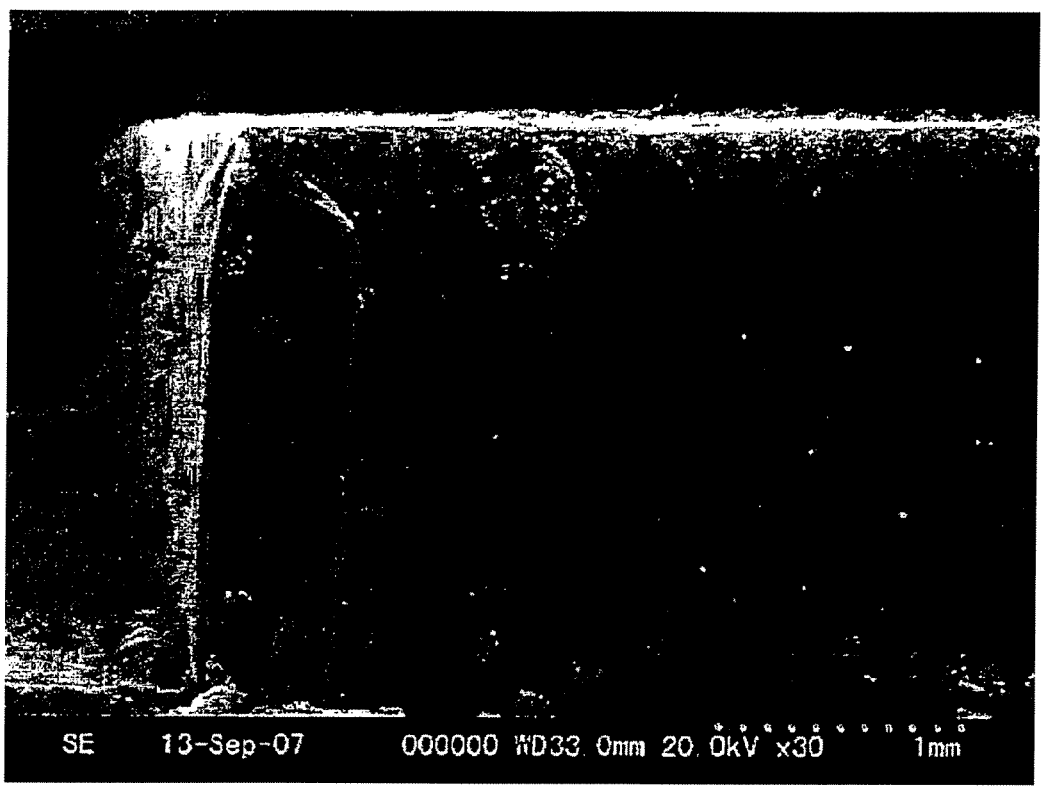
FIG. 9A is a drawing showing the external appearance of carbon nanotubes observed by a scanning electron microscope.
Figure 9B:
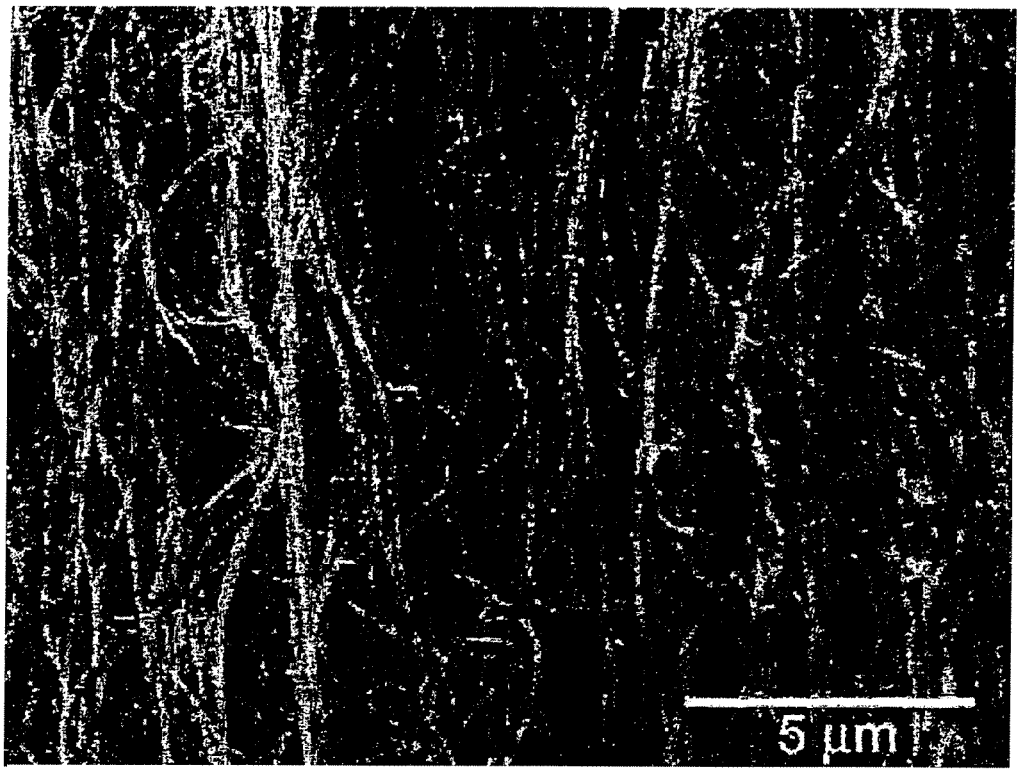
FIG. 9B is an enlarged drawing thereof.

Further, FIG. 7A shows a portion of a quartz substrate before carbon nanotubes are grown, and FIG. 7B shows a portion of the substrate at which carbon nanotubes were grown by the above-described method with the temperature of the electric furnace interior being 820° C., the pressure of the acetylene gas being 10 Torr, and the flow rate of the acetylene gas being 200 sccm. As shown in FIG. 7B of the same country, it can be understood that carbon nanotubes are growing so as to be oriented vertically at the obverse and reverse, side surfaces of the quartz plate substrate. Further, the entire substrate at which the carbon nanotubes were grown on the quartz plate substrate 28 is shown in FIG. 8. Moreover, a drawing observing the external appearance of the grown carbon nanotubes by a scanning electron microscope (SEM) is shown in FIG. 9A. Further, a drawing observing in an enlarged manner by an SEM is shown in FIG. 9B. The nanotube diameter is around 20-50 nm. Note that the length of the grown carbon nanotubes is 2.1 mm.

Figure 10:
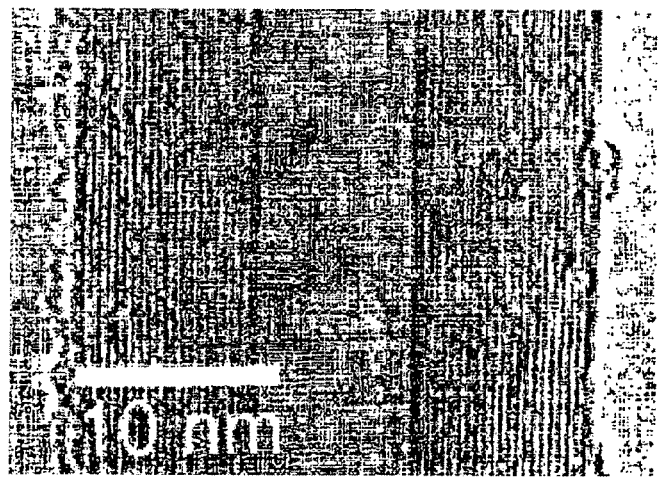
FIG. 10 is a drawing showing carbon nanotubes observed by a transmission electron microscope.

Moreover, a drawing observing the grown carbon nanotubes by a transmission electron microscope (TEM) is shown in FIG. 10. It can be understood that the nanotubes are hollow multi-layer carbon nanotubes.

Figure 11:
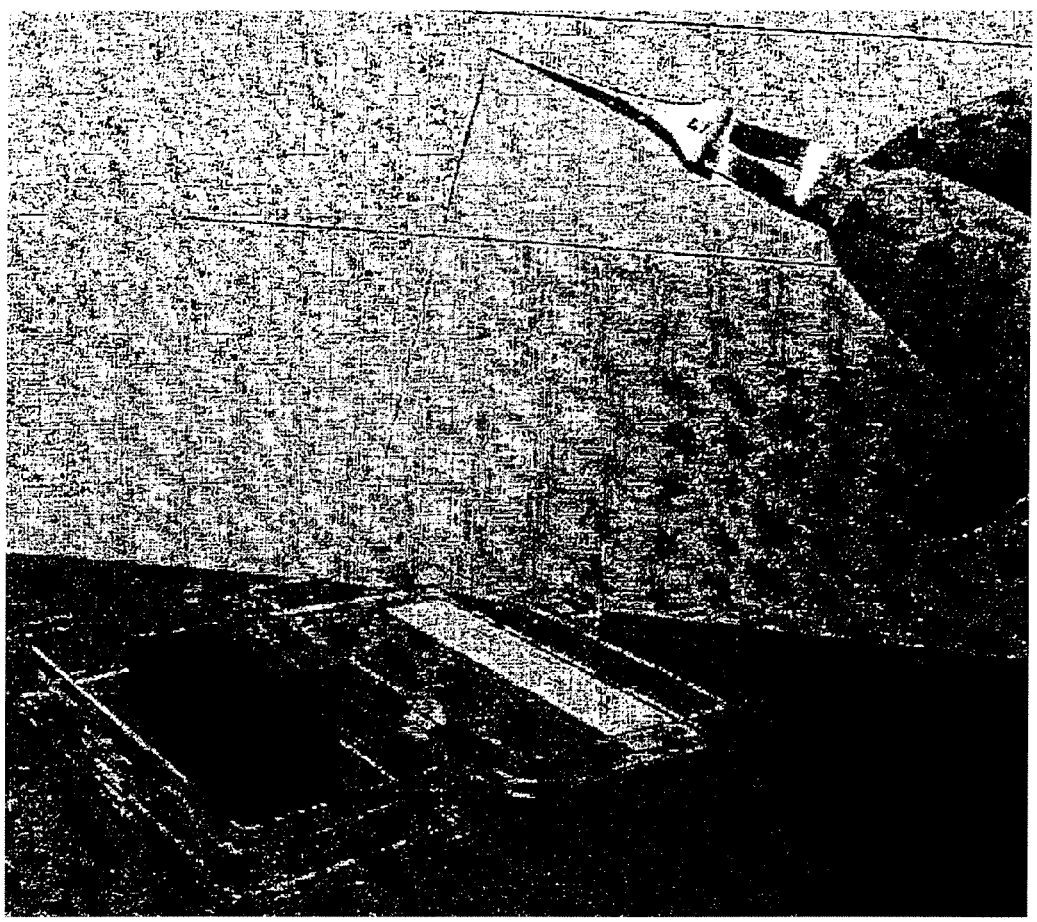
FIG. 11 is a drawing showing that carbon nanotube fibers can be spun by pinching and pulling-out, by forceps, one end of a carbon nanotube grown on a quartz substrate.

Because the grown carbon nanotube layer is formed densely on the substrate, when one end is pulled-out as shown in FIG. 11, adjacent carbon nanotubes are spun in the form of a long fiber that runs in a line without breaks, and a carbon nanotube fiber can be fabricated.

Spinning a fiber in which carbon nanotubes run in a line is useful in terms of applications as a material, and therefore, various methods have been tried until now. For example, a method of spinning an elongated fiber from gathered carbon nanotubes is proposed in Japanese Patent Application National Publication No. 2008-517182, Japanese Patent No. 3954967, or Japanese Patent Application National Publication No. 2008-523254 or the like. However, these are techniques that line-up and spin the carbon nanotubes from a state in which the gathered carbon nanotubes are suspended in a solvent, or the like. Further, in recent research papers, it is reported that carbon nanotubes that are grown densely on a substrate can be spun by the carbon nanotubes being pulled-out so as to run in a line when pulled-out from ones of ends thereof. However, in accordance with this method as well, there are limitations in terms of the form and the amount, such as only a uniform range of carbon nanotubes that are formed on a substrate are spun, or the like, and the obtained structure is limited to a fiber of a constant length.

Figure 12:
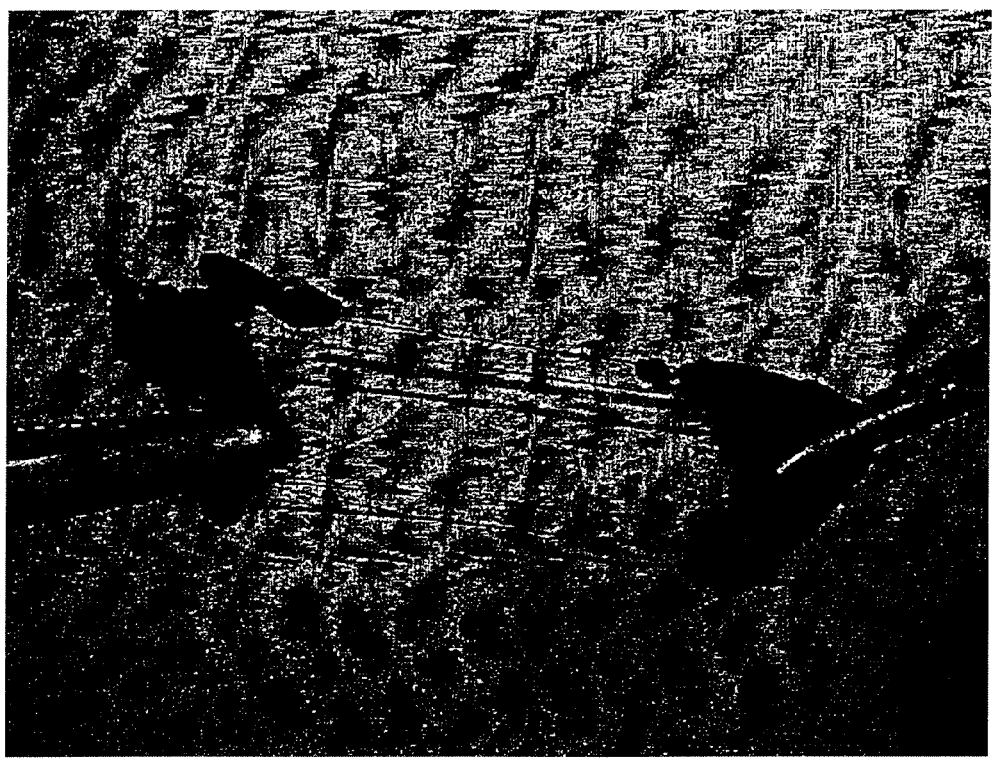
FIG. 12 is a drawing showing that carbon nanotube fibers can be spun from a carbon nanotube congregate mass that is peeled-off and gathered from a substrate.

In the present invention, as shown in FIG. 12, carbon nanotube fibers can similarly be pulled out and spun also from a carbon nanotube congregate mass that is fabricated by peeling-off and gathering carbon nanotubes that are deposited on a substrate or a quartz surface. The thread end, that pulls-out the carbon nanotube fibers, may be pinched by forceps as shown in FIG. 11, or may be pulled-out by an adhesive means.

Thus, when pulling-out carbon nanotubes while providing a width by using adhesive tape or the like, in imitation of this, the carbon nanotubes can be pulled-out as a carbon nanotube tape or a carbon nanosheet as shown in cause 13. In this way, the carbon nanofibers obtained by the present invention can be, from a massed form, made into various shapes from an elongated fiber to the form of a tape or a sheet by a spinning method.

When carbon nanotubes are spun so as to run in a line with adjacent carbon nanotubes, these forces work between the adjacent carbon nanotubes. Therefore, if the carbon nanotubes that are initially pulled-out are lined-up in the lateral direction, the shape of the array thereof is used as a mold, and a tape or a sheet of an arbitrary width in which the fibers run in a line in the lateral direction, i.e., the widthwise direction, can be fabricated by these spinning methods.

Figure 13:
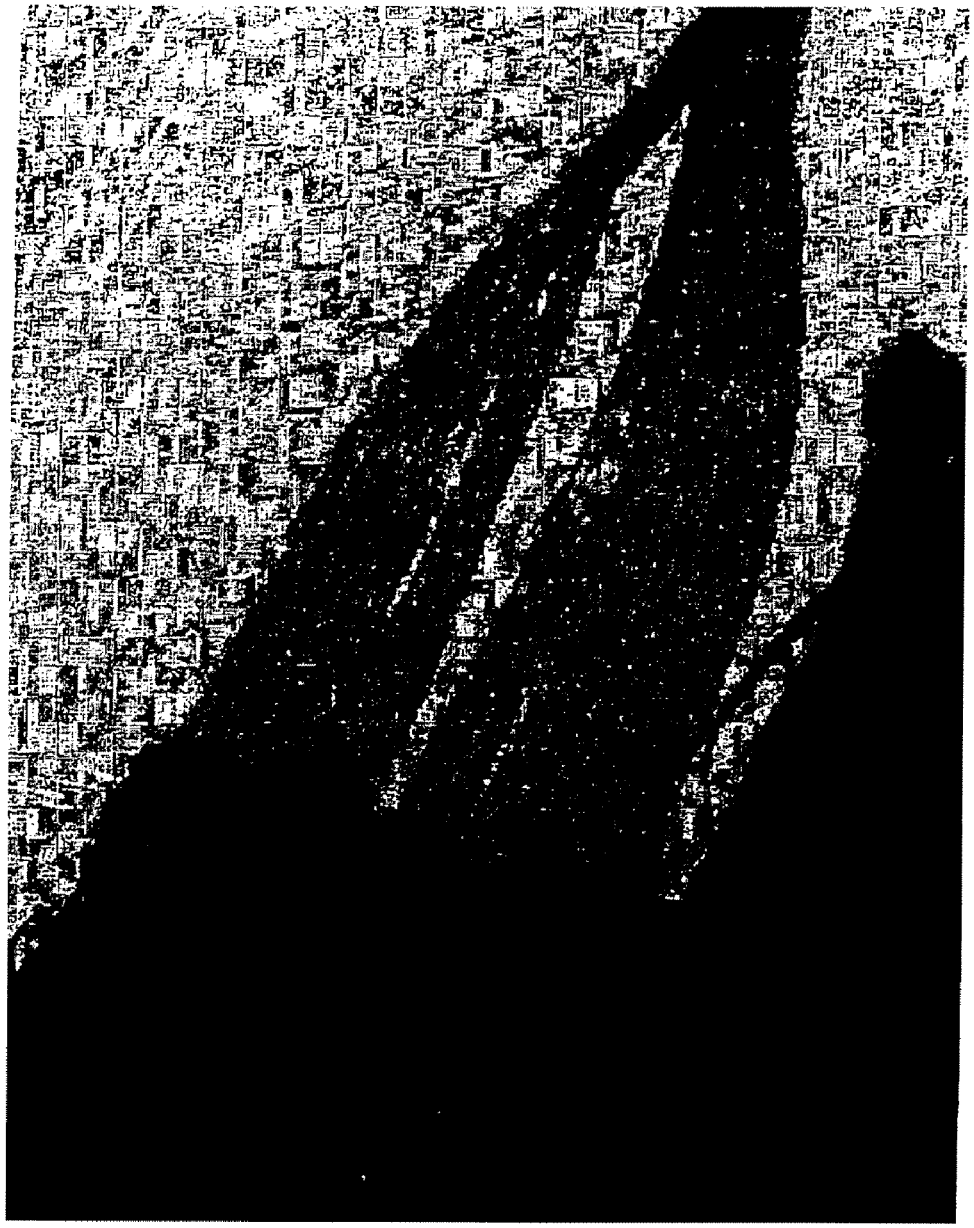
FIG. 13 is a drawing showing that carbon nanotube tapes can be fabricated by pulling-out ones of ends of carbon nanotubes, while maintaining a width of a certain extent, from a carbon nanotube congregate mass.

As shown in the photograph drawing of FIG. 13, the tape or the sheet that is fabricated in this way is a form in which the carbon nanotube fibers that are spun from the carbon nanotubes run in a line uniformly in the widthwise direction, and the thicknesses thereof as well are uniform, and a form of carbon nanotubes that is used as a mold is maintained.

Figure 14:
FIG. 14 is a drawing showing a carbon nanotube pattern that is oriented vertically, that is formed on a stainless substrate.

Because the carbon nanotubes produced by the production method of the present invention have the property of growing only at a silicon oxide surface, the pattern of the silicon oxide layer can be formed by photolithography or the like on the substrate surface that is formed from an appropriate material, and carbon nanotubes can be grown on this silicon oxide layer surface. A substrate fabricated by this method is shown in FIG. 14. As shown in the drawing, the carbon nanotubes that are formed so as to be oriented vertically on the substrate can be formed at an extremely high density and to uniform lengths (heights).

Further, the carbon nanotubes that are produced by the present invention grow as shapes, structures that have high linearity, at an extremely high density in accordance with the characteristic of being oriented vertically on the growth surface.

Figure 15A:
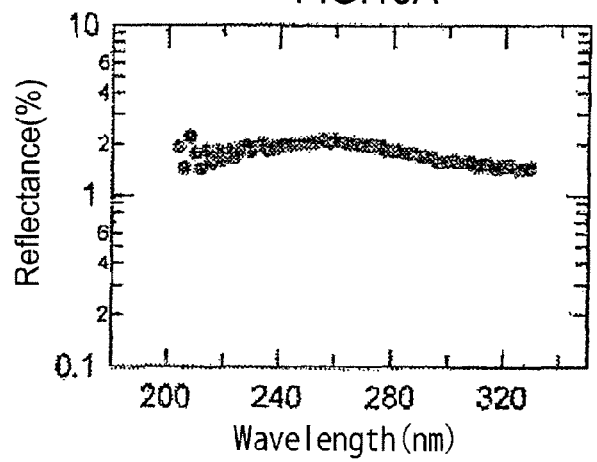
FIG. 15A is a drawing showing the light reflecting spectrum of the ultraviolet region of wavelengths of from 200 nm to 330 nm.
Figure 15C:
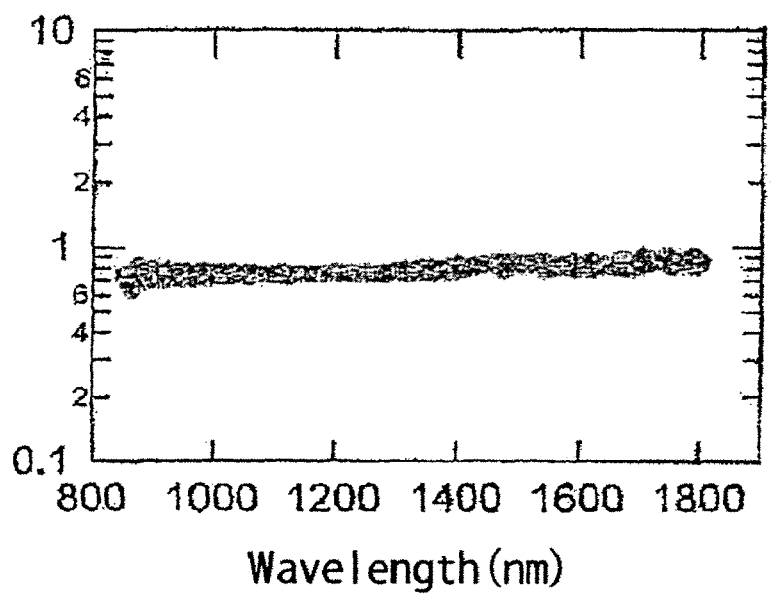
FIG. 15C is a drawing showing the light reflecting spectrum of the infrared region of wavelengths of from 850 nm to 1800 nm.
Figure 15B:
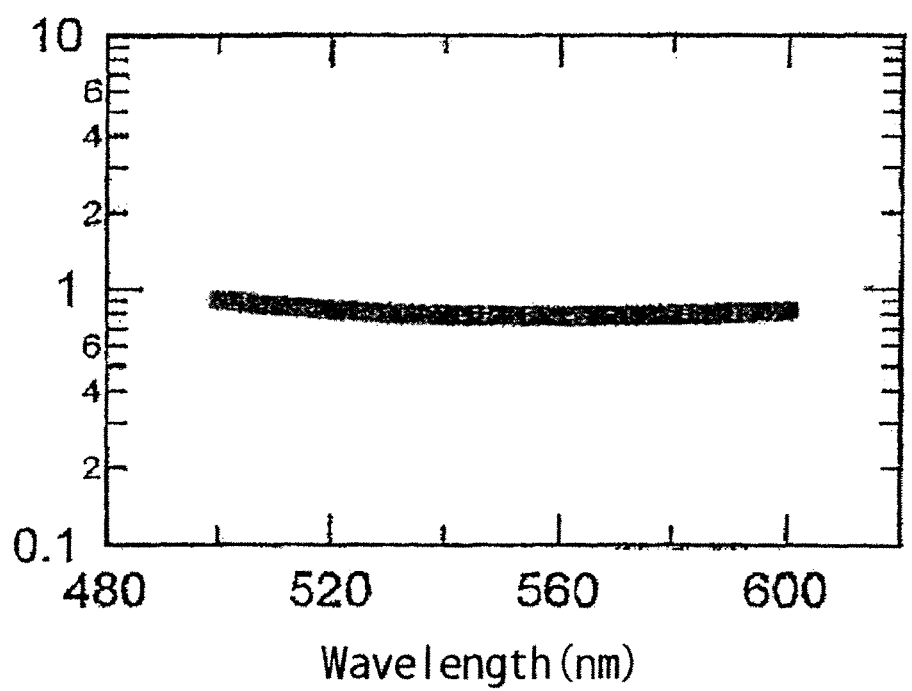
FIG. 15B is a drawing showing the light reflecting spectrum of the visible light region of wavelengths of from 500 nm to 600 nm.

Therefore, the substrate on which the carbon nanotubes of the present invention that are oriented vertically are formed, exhibits an extremely low light reflectance. As shown in FIGS. 15A, 15B, 15C, these characteristics have the characteristic of a reflectance of less than or equal to 2% from the ultraviolet region of a wavelength of 200 nm to the infrared region of a wavelength of 1.8µ.

USAGE POTENTIAL IN INDUSTRY

In this way, in accordance with the present invention, carbon nanotubes that are oriented vertically can be grown by a method that is more simple than conventional methods, and fibers, tapes, or sheets can be fabricated directly from the carbon nanotubes obtained in this way. Further, the formation region of the carbon nanotubes can be patterned by utilizing the property that carbon nanotubes can be formed selectively by the silicon oxide layer. Moreover, they have a low light reflectance characteristic due to these carbon nanotubes that are oriented vertically. New applications utilizing these characteristics, including the above-described fields of application, are anticipated.

The invention claimed is:

1. A method of producing carbon nanotubes on a substrate, the method comprising:
    vacuum-exhausting, to less than or equal to $10^{-2}$ Torr, a reaction vessel tube interior containing iron chloride and silicon oxide;
    disposing in the reaction vessel tube interior a hollow substrate having an inner wall, wherein the silicon oxide is disposed on a surface of the inner wall, wherein the substrate comprises a circular or polygonal cross-sectional configuration;
    heating the reaction vessel tube interior to a temperature in a range of 700° C.-900° C. while maintaining a pressure of the reaction vessel tube interior to less than or equal to $10^{-2}$ Torr;
    bleeding acetylene into the reaction vessel tube interior at a supply pressure within a range of 0.1 Torr-50 Torr, wherein, at a time of start of bleeding acetylene, the pressure of said acetylene is set to be lower than the supply pressure; and
    growing the carbon nanotubes from iron carbide that is formed by a chemical vapor-phase reaction in the presence of the iron chloride provided at the inner wall.

2. The method of producing carbon nanotubes of claim 1, wherein the silicon oxide is a silicon oxide compound that is $SiO_x$ ($0<x\leq2$).

3. The method of producing carbon nanotubes of claim 1, wherein the iron chloride is at least one of iron (II) chloride and iron (III) chloride.

4. The method of producing carbon nanotubes of claim 1, wherein the silicon oxide is patterned on a substrate, and a carbon nanotube formation region that is oriented vertically is patterned on the substrate.

5. A production method that forms elongated fibers or elongated tapes or sheets that are formed from carbon nanotubes, comprising: making carbon nanotubes by the method of claim 1, into a congregate mass, and pulling-out and spinning carbon nanotubes from the congregate mass.

6. A production method that forms elongated fibers or elongated tapes or sheets that are formed from carbon nanotubes, comprising: making carbon nanotubes by the method of claim 1, into a congregate mass, and, by uniformly arranging in a widthwise direction and pulling-out carbon nanotubes from the congregate mass, spinning tapes or sheets by using the pulled-out ends as a mold.

\* \* \* \* \*